E. A. NELSON.
LUBRICATING SYSTEM FOR ENGINE AND TRANSMISSION.
APPLICATION FILED FEB. 2, 1912.
1,144,496.  Patented June 29, 1915.
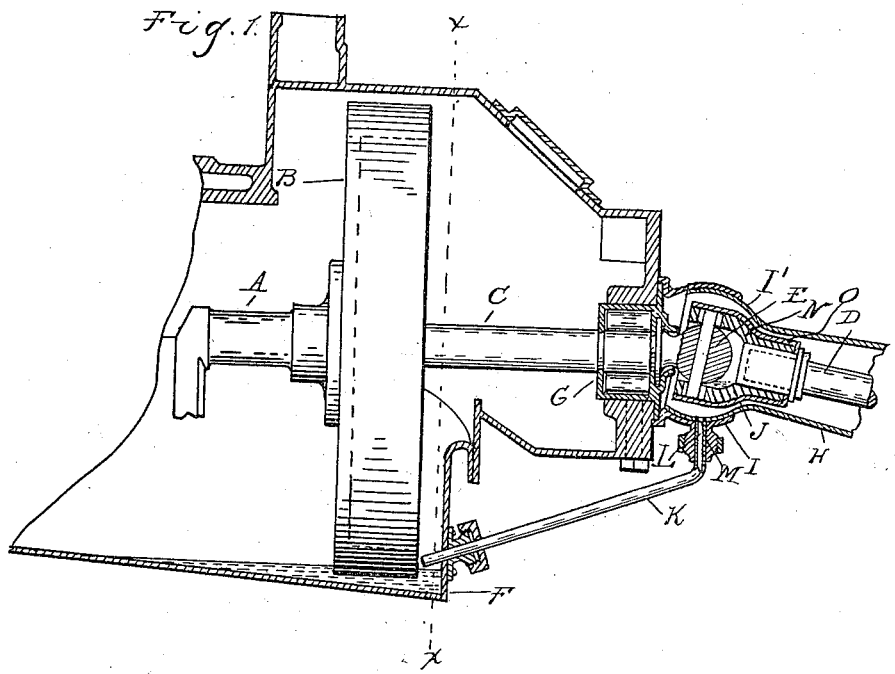
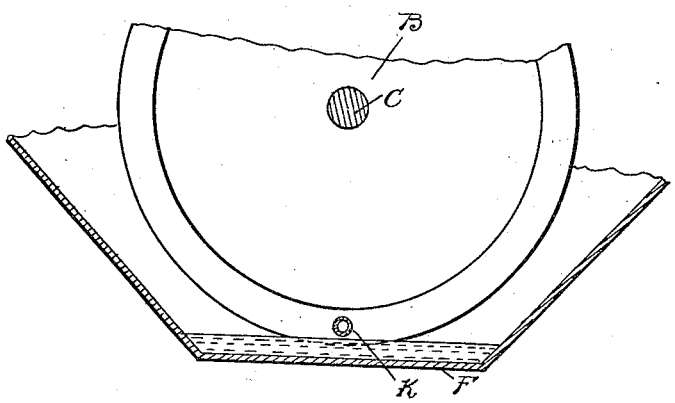
Witnesses  
W. L. Ford  
James P. Barry
Inventor  
Emil A. Nelson  
By Whittemore Hulbert Whittemore  
Attys

UNITED STATES PATENT OFFICE.

EMIL A. NELSON, OF DETROIT, MICHIGAN, ASSIGNOR TO HUPP MOTOR CAR COMPANY, OF DETROIT, MICHIGAN, A CORPORATION OF MICHIGAN.

LUBRICATING SYSTEM FOR ENGINE AND TRANSMISSION.

1,144,496. Specification of Letters Patent. Patented June 29, 1915.

Application filed February 2, 1912. Serial No. 674,951.

*To all whom it may concern:*

Be it known that I, EMIL A. NELSON, a citizen of the United States of America, residing at Detroit, in the county of Wayne and State of Michigan, have invented certain new and useful Improvements in Lubricating Systems for Engine and Transmission, of which the following is a specification, reference being had therein to the accompanying drawings.

The invention relates to engine and transmission constructions and has more particular reference to the means employed for lubricating parts of the mechanism as hereinafter set forth.

In the drawings,—Figure 1 is a longitudinal section, partly in elevation; and Fig. 2 is a cross section on line *x—x* Fig. 1.

A is the engine shaft, B the fly wheel mounted thereon, C a transmission shaft in axial alinement with the engine shaft, and D the propeller shaft which is coupled by a universal ball and socket coupling to the shaft C. The fly wheel and transmission shaft C are mounted in a casing F which is in open communication with the crank case, and which includes in addition to the parts mentioned a suitable variable speed transmission gearing (not shown). At the end of this case F is a journal bearing G for the shaft C and beyond said case is a housing H for the propeller shaft which has a universal joint formed by complementary spherical bearings I I' concentric with the universal joint of the shafts C and D.

During the operation of the engine the mechanism within the housing F is lubricated by any suitable lubricating system such for instance as the usual splash system where the lubricant is thrown up by the revolving cranks. The lubricant thus applied will force its way to the various running parts within the case F, the bearing G, and will further pass through said bearing and into the universal joint of the shafts. It is desirable however, to prevent the further flow down the inclined propeller shaft or through the housing H therefor and to this end I devised the following construction:

The universal joint between the shafts C and D is formed by a ball E on the shaft C and a cup-shaped socket J having its neck portion secured to the propeller shaft. The socket J is constructed to form a cup having imperforate sides and flares outward within the spherical portion of the universal joint I I'. This cup-shaped socket receives the lubricant passing to the universal joint between the shafts and when the supply within the cup-shaped member overflows, the lubricant instead of running down the propeller shaft will drain to the center of the spherical bearing I'. This accumulation is then removed by a drain conduit K which has one end communicating with the interior of the portion I' through alining apertures L and M in the bearings I I' and which inclines downward into the portion of the housing F adjacent to the fly-wheel and has its discharge end in proximity to said wheel.

Preferably the socket J is formed of two parts, a member N which with the member E forms a universal joint of standard construction, and a member O of configuration complementary to the member N but having imperforate sides so as to prevent the lubricant from discharging from the socket J except by overflowing at the flared end thereof.

In operation the rotation of the fly wheel B laterally past the end of the drain conduit K will act as a pump, sucking the lubricant from said conduit and preventing any accumulation in the spherical housing I sufficient to flow downward into the housing H.

What I claim as my invention is:

1. The combination with a driving member and a downwardly-inclined power transmission shaft, of a universal coupling for connecting said shaft and said driving member including a cup, and means for feeding lubricant to said coupling, said cup being secured to rotate with said downwardly-inclined shaft and arranged to prevent the flow of lubricant fed to the coupling down said shaft.

2. The combination with a substantially horizontally-arranged shaft and a downwardly-inclined shaft, of a universal coupling connecting said shafts, including a socket provided with a cup-shaped member forming a draining surface, a housing surrounding said shafts and coupling having a pocket for receiving the lubricant drainage therefrom, and a drainage connection leading from said pocket.

3. The combination of a driving member and a downwardly-inclined shaft, a universal coupling connecting said driving member and shaft, means for feeding lubricant to the coupling, means for preventing lubricant fed to said universal coupling from draining downward along the inclined shaft, a pocket for receiving the lubricant, and means for draining the lubricant from said pocket.

4. The combination with a substantially horizontally arranged shaft and a downwardly inclined shaft, of a universal coupling connecting said shafts including a socket provided with a cup-shaped member forming a draining surface, and a housing surrounding said shafts and coupling and having a pocket for receiving the lubricant drainage therefrom.

5. The combination of a casing, a substantially horizontally-arranged drive shaft therein, a universal coupling connecting said shafts, means for feeding lubricant to the coupling, means for preventing lubricant fed to said universal coupling from draining downward along the inclined shaft, a pocket for receiving the lubricant, and means for draining the lubricant from said pocket into said casing.

6. The combination with a substantially horizontally arranged drive shaft and a downwardly inclined power transmission shaft, of a universal coupling connecting said shafts including a cup secured to said inclined shaft and having a flared end forming a guard preventing the flow of lubricant down the inclined shaft, a housing surrounding said shafts and coupling having a pocket for receiving the lubricant drainage, and a drain connection communicating with said pocket.

7. The combination with an engine casing, of a fly-wheel therein, a drive shaft connected therewith, a downwardly inclined transmission shaft, a universal coupling connecting said shafts, means for preventing lubricant on said universal coupling from draining downward along the inclined shaft, a pocket for receiving the lubricant drainage from said coupling, and a conduit connecting said pocket having its discharge end adjacent to said fly-wheel.

8. The combination with an engine casing, a fly-wheel therein, a power transmission shaft, a downwardly inclined shaft, a universal coupling connecting said shafts, a housing surrounding said shafts and coupling provided with a lubricant receiving pocket, means for draining the lubricant from said coupling into said pocket, and a conduit connected with said pocket and having its discharge end in proximity to said fly-wheel.

9. The combination with an engine casing, of a fly-wheel therein, a power transmission shaft, a downwardly inclined shaft, a universal coupling for said shaft including an inclosing cup secured to the downwardly inclined shaft, said cup serving to intercept the lubricant discharged from the coupling parts and flared to drain the lubricant away from the downwardly inclined shaft, a housing surrounding said shafts and coupling having a spherical portion forming a lubricant receiving pocket, and a conduit connecting said pocket and having its discharge end in proximity to said fly-wheel, for the purpose described.

10. The combination with a driving member and a power transmission shaft, of a universal coupling for connecting said driving member and transmission shaft, said coupling comprising a ball upon said driving member, a cup-shaped member fitting said ball and having its neck portion secured to said transmission-shaft, and a complementary cup-shaped member having imperforate sides upon said first mentioned cup-shaped member, and means for feeding lubricant to said coupling.

In testimony whereof I affix my signature in presence of two witnesses.

EMIL A. NELSON.

Witnesses:
  FRANK E. WATTS,
  GRANVILLE C. ALDRICH.